June 8, 1937.　　　　C. F. IRISH　　　　2,083,153
APPARATUS FOR THE TREATMENT OF SOIL
Filed Jan. 22, 1936

INVENTOR.
Chas. F. Irish,
BY
Hull, Brock & West,
ATTORNEYS.

UNITED STATES PATENT OFFICE 2,083,153

APPARATUS FOR THE TREATMENT OF SOIL

Charles F. Irish, Bratenahl, Ohio

Application January 22, 1936, Serial No. 60,238

6 Claims. (Cl. 47—49)

This invention relates to a process of and an apparatus for treating soil, and has for its general object to provide a process and apparatus whereby soil may be efficiently treated, and particularly soils which, because of inefficient drainage, or because of their non-porous condition, are difficult to aerate and to treat with soil-rectifying materials, such as powdered or liquid fungicides and insecticides, fertilizer, lime, sulphur, or other materials capable of correcting acidity and alkalinity and improving or protecting plant growth.

Figure 1:
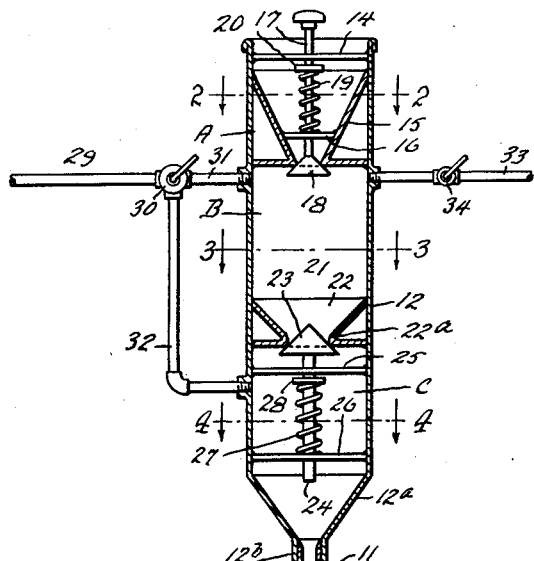
Figure 2:
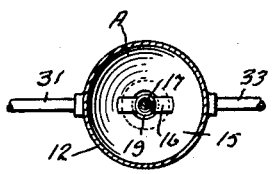
Figure 3:
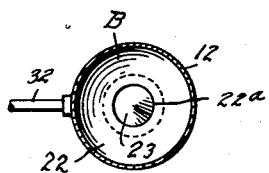
Figure 4:
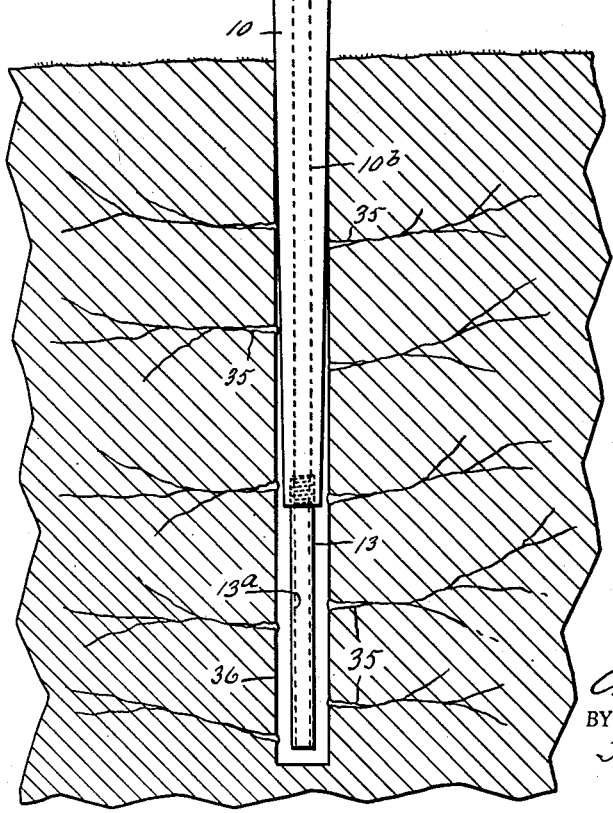
Figure 4:
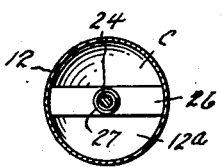

In carrying out my invention, I employ an apparatus of the type shown in the drawing hereof, wherein Fig. 1 represents the apparatus, the lower part being shown in elevation and the upper part in section and wherein Figs. 2, 3, and 4 are sectional details corresponding respectively to the lines 2—2, 3—3 and 4—4 of Fig. 1.

Describing the parts of the apparatus in detail, 10 denotes the main portion of a tool which is in the form of a long tubular body, the exterior of which is gradually tapered from the upper to the lower end thereof, the inclination of such outer wall being approximately 2°. The upper end of the body is provided with a threaded opening 10ᵃ for the reception of the threaded lower end of the nipple 11, the upper end of which is secured in any suitable manner (as by soldering or welding) in the cylindrical lower end 12ᵇ of the hopper-shaped bottom 12ᵃ of a cylindrical casing 12. Where necessary, an extension tube 13 is threaded into the lower end of the body 10. The hole into which the tool bodies 10 and 13 are introduced is pre-formed by a bar or auger and the body 10 is inserted into the hole under sufficient pressure to form a sealing fit within the upper portion thereof.

Within the upper end of the casing 12 is a strap 14, and below said strap is a hopper-shaped receptacle 15 having a strap 16 extending across the lower portion thereof. The straps 14 and 16 are provided with apertures forming a guide for a stem 17 having at its lower end a conical valve 18 adapted to close the opening in the bottom of the receptacle 15. A spring 19 surrounds the valve stem 17, bearing at one end on the strap 16 and at its opposite end against an abutment 20 on the stem, thereby tending to hold the valve 18 closed.

Within and forming the bottom of a compartment 21 below the receptacle 15, is a short hopper 22 having in its bottom a discharge outlet 22ᵃ which is normally closed by a conical valve 23 mounted on a stem 24 which extends through guide openings provided within straps 25 and 26 extending across the compartment. This valve is normally held in closed position by means of a spring 27 which bears at one end against the strap 26 and at its opposite end against an abutment 28 on the valve stem.

By the construction described, the casing is divided into three chambers or compartments, the first compartment A comprising the hopper 15, the second compartment B comprising the chamber formed between the bottom of the hopper 15 and the bottom of the hopper 22, and the third compartment C being that portion of the casing below the hopper 22.

29 denotes a pipe through which air under pressure may be delivered, by means of a three-way valve 30, into the compartment B through the branch pipe 31, or into the compartment C through the branch pipe 32, or into both of the compartments B and C through the pipes 31 and 32.

33 denotes another pipe which is adapted to deliver into the compartment B, by opening the valve 34, a liquid such as water, or a liquid insecticide or fungicide; or a liquid in which a fertilizer is dissolved or suspended.

In practice, the pressure of air supplied through the pipe 29, is at least as high as 80 pounds per square inch and preferably as high as 200 pounds per square inch.

In the use of the apparatus described herein for the purpose of realizing my process, air will be introduced through pipes 29 and 32 into the bores 10ᵇ and 13ᵃ of the tool bodies and thence into the hole surrounding said bodies under a sufficient pressure to produce what is known in the industry to which this invention relates as a "heave" in the soil, from which fissures will extend, as indicated at 35. Heretofore, it has been necessary to remove the tool from the hole thus treated in order to introduce fertilizer or other desirable materials into the hole preparatory to forcing them through the soil by reinserting the tool into the hole and again applying air pressure thereto. However, the removal of the first mentioned tool, with the cessation of pressure, is frequently accompanied by a clogging of the portions of the fissures leading from the hole 36. This action is particularly apt to occur when the soil is of a sandy nature or of a nature lending itself to disintegration in a finely-divided condition. When the second tool should be inserted or the same tool re-inserted, for the purpose of supplying soil-rectifying agents of the character mentioned, as the fissures were closed it was necessary to apply sufficient pressure to create new fissures for the reception of the material or materials capable of improving or protecting plant life but without obtaining the wide distribution of the material or materials that can be obtained by the process and apparatus set forth herein.

In the practice of my process, by the apparatus described herein, I am able to produce the "heave" and the fissures in the soil, as indicated, by the air admitted through the pipes 29, 32 and the tool bodies 10, 13. Then, when desired to add the soil-rectifying agents, the same will have been first delivered into the compartment B by depressing the valve 18; and then by moving the valve 30 to a position to deliver any part or all of the air into the compartment B, the fertilizer or other material for improving or protecting plant growth may be delivered through the valve 23 and carried along with the air and delivered through the tool bodies 10, 13 and into the open fissures.

Where desirable, water may be supplied to the compartment B through the pipe 33 simultaneously with air or gas through the pipe 31 and may be delivered, together with the air or gas, into the soil. In like manner, any desired solution or suspension of materials capable of improving or protecting plant growth may be delivered into the compartment B and thence in turn into the soil.

Having thus described my invention, what I claim is:

1. An apparatus for the treatment of soil comprising a tool adapted to be inserted in the soil and to seal the upper portion of the wall of the soil surrounding the tool, a casing having a bottom and connected to the bore of said tool at a point adjacent to said bottom, the said casing also having a compartment above the bottom thereof, the said compartment having a bottom and an outlet at the bottom thereof, a valve normally closing said outlet, a pipe for fluid under high pressure having branches adapted to communicate respectively with the said compartment and with the casing below said compartment, and means for delivering an aeriform fluid from said pipe to either or both of the said branches.

2. An apparatus for the treatment of soil comprising a tool adapted to be inserted in the soil and to seal the upper portion of the wall of the soil surrounding the tool, a casing having a bottom and connected to the bore of said tool at a point adjacent to said bottom, the said casing also having a compartment above the bottom thereof, the said compartment having a bottom and an outlet at the bottom thereof, an upwardly seating valve, means normally seating said valve in said outlet, a pipe for fluid under high pressure adapted to communicate with the said compartment and with the casing below the said compartment, and means for delivering and for controlling the delivery of said fluid to either the compartment or the space below the same, or simultaneously to the said compartment and to the said space.

3. An apparatus for the treatment of soil comprising a tool adapted to be inserted in the soil and to seal the upper portion of the wall of the soil surrounding the tool, a casing connected to the bore of said tool, the said casing having a bottom and a compartment above the bottom thereof, said compartment having a bottom and an outlet at the bottom thereof, a valve normally closing said outlet, a pipe for fluid under high pressure adapted to communicate with the said compartment and with the casing below said compartment, means for delivering and for controlling the delivery of said fluid to either the compartment or the space below the same, or simultaneously to the said compartment and to the said space, and a pipe adapted to communicate with the said compartment for supplying another fluid thereto.

4. An apparatus for the treatment of soil comprising a tool adapted to be inserted in the soil and to seal the upper portion of the wall of the soil surrounding the tool, a casing connected to the bore of said tool, the said casing having a compartment above the bottom thereof, said compartment having a bottom and an outlet in the bottom thereof, a valve normally closing said outlet, a pipe for fluid under high pressure adapted to communicate with the said compartment and with the casing below said compartment, means for delivering and for controlling the delivery of said fluid to either the compartment or to the space therebelow, or simultaneously to the compartment and to the said space, and means for introducing liquid into the fluid supplied to the said space.

5. An apparatus for the treatment of soil comprising a tool adapted to be inserted in the soil and to seal the upper portion of the wall of the soil surrounding the tool, a casing connected to the bore of said tool, the said casing having a compartment above the bottom thereof, said compartment having a bottom and an outlet at the bottom thereof, a valve normally closing said outlet, a pipe for fluid under high pressure adapted to communicate with the said compartment and with the casing below said compartment, means for delivering and for controlling the delivery of said fluid to either the compartment or the space therebelow or simultaneously to the said compartment and to the said space, a compartment in the upper portion of said casing having an outlet in the bottom thereof adapted to deliver material into the first mentioned compartment, and a valve normally closing the said opening.

6. An apparatus for the treatment of soil comprising a tool adapted to be inserted in the soil and to seal the upper portion of the wall of the soil surrounding the tool, a casing connected to the bore of said tool, the said casing having an opening adjacent to the bottom thereof communicating with the bore of said tool and provided thereabove with a compartment having a bottom and an opening in the bottom thereof, an upwardly seating valve normally closing said opening, the said casing also having a second compartment, above the first-mentioned compartment, provided with an opening in the bottom thereof and an upwardly seating valve normally closing said opening, a pipe for fluid under high pressure adapted to communicate with the first-mentioned compartment and with the portion of the casing below said first mentioned compartment, means for delivering and controlling the delivery of the said fluid to either the first compartment or the space below the same or simultaneously to the said compartment and to the said space, and means for delivering another fluid to the first mentioned compartment.

CHARLES F. IRISH.